US011294572B2

(12) United States Patent
Spencer

(10) Patent No.: US 11,294,572 B2
(45) Date of Patent: Apr. 5, 2022

(54) DATA STORAGE SYSTEM WITH LATE READ BUFFER ASSIGNMENT AFTER ARRIVAL OF DATA IN CACHE

(71) Applicant: Seagate Technology LLC, Cupertino, CA (US)

(72) Inventor: Thomas V. Spencer, Fort Collins, CO (US)

(73) Assignee: Seagate Technology, LLC, Cupertino, CA (US)

( * ) Notice: Subject to any disclaimer, the term of this patent is extended or adjusted under 35 U.S.C. 154(b) by 214 days.

(21) Appl. No.: 15/642,413

(22) Filed: Jul. 6, 2017

(65) Prior Publication Data

US 2019/0012093 A1 Jan. 10, 2019

(51) Int. Cl.
G06F 3/06 (2006.01)

(52) U.S. Cl.
CPC .......... G06F 3/0611 (2013.01); G06F 3/0656 (2013.01); G06F 3/0679 (2013.01); G06F 3/0688 (2013.01)

(58) Field of Classification Search
CPC .... G06F 3/0611; G06F 3/0688; G06F 3/0656; G06F 3/0679
See application file for complete search history.

(56) References Cited

U.S. PATENT DOCUMENTS

| | | | |
|---|---|---|---|
| 5,802,552 A | 9/1998 | Fandrich et al. | |
| 5,860,106 A * | 1/1999 | Domen | G06F 12/0215 |
| | | | 713/324 |
| 6,446,167 B1 * | 9/2002 | Mayfield | G06F 9/3802 |
| | | | 711/118 |
| 6,654,346 B1 * | 11/2003 | Mahalingaiah | H04L 45/04 |
| | | | 370/235 |
| 7,050,337 B2 | 5/2006 | Iwase et al. | |
| 7,405,974 B2 | 7/2008 | Yaoi et al. | |
| 7,590,024 B2 | 9/2009 | Kang | |
| 7,755,926 B2 | 7/2010 | Tan et al. | |
| 7,898,835 B2 | 3/2011 | Kashiwa | |

(Continued)

OTHER PUBLICATIONS

Cache Memory and Performance. Lecture slides [online]. Carnegie Mellon University, 2005-2013 [retrieved on Jul. 24, 2018], Retrieved from the Internet: <http://courses.cs.vt.edu/cs2506/Fall2014/Notes/L14.MemoryHierarchy.pdf>. (Year: 2013).*

(Continued)

Primary Examiner — Chie Yew
(74) Attorney, Agent, or Firm — Hall Estill Law Firm

(57) ABSTRACT

A data storage system may have a number of data storage devices that each have a non-volatile memory connected to different first and second memory buffers. A data storage device can consist of a non-volatile memory where a data sector is stored. A network controller can consist of a buffer module connected to a first memory buffer and a second memory buffer that receives a data read request from the host for the data sector and evaluates the first and second memory buffers as a destination for the data sector after the data sector arrives at the buffer module. The buffer module may choose the first memory buffer and store the data sector in the first memory buffer prior to providing the data sector to the host to satisfy the data read request from the first memory buffer.

20 Claims, 3 Drawing Sheets

(56) References Cited

U.S. PATENT DOCUMENTS

| | | | |
|---|---|---|---|
| 8,145,984 B2 | 3/2012 | Sommer et al. | |
| 9,001,546 B2 | 4/2015 | Chen et al. | |
| 2003/0221069 A1* | 11/2003 | Azevedo | G06F 12/0862 711/136 |
| 2004/0107318 A1* | 6/2004 | Bono | G06F 12/0866 711/118 |
| 2005/0066121 A1* | 3/2005 | Keeler | G06F 12/0897 711/113 |
| 2006/0143396 A1* | 6/2006 | Cabot | G06F 12/121 711/134 |
| 2007/0118561 A1* | 5/2007 | Idicula | G06F 16/972 |
| 2007/0186045 A1* | 8/2007 | Shannon | G06F 12/128 711/133 |
| 2008/0244186 A1* | 10/2008 | Bose | G06F 11/1497 711/135 |
| 2008/0301164 A1* | 12/2008 | Isobe | G06F 17/30067 |
| 2010/0125704 A1* | 5/2010 | Kanai | G06F 12/0804 711/113 |
| 2011/0010519 A1* | 1/2011 | Cobley | G06F 9/5016 711/170 |
| 2017/0237681 A1* | 8/2017 | Sesha | G06F 9/505 709/213 |
| 2018/0018271 A1* | 1/2018 | Moyer | G06F 12/0804 |
| 2018/0165214 A1* | 6/2018 | Farmahini Farahani | G06F 12/0888 |

OTHER PUBLICATIONS

Oracle Flash. Datasheet [online]. Oracle, 2014 [retrieved on Aug. 9, 2018]. Retrieved from the Internet <http://www.oracle.com/us/products/servers-storage/pillar-axiom-software-ds-487459.pdf>. (Year: 2014).*

* cited by examiner

DATA STORAGE SYSTEM WITH LATE READ BUFFER ASSIGNMENT AFTER ARRIVAL OF DATA IN CACHE

SUMMARY

A data storage system, according to various embodiments, has a number of data storage devices that each have a non-volatile memory connected to different first and second memory buffers. A data storage device consists of a non-volatile memory where a data sector is stored. A network controller consists of a buffer module connected to a first memory buffer and a second memory buffer that receives a data read request from the host for the data sector and evaluates the first and second memory buffers as a destination for the data sector after the data sector arrives at the buffer module. The buffer module chooses the first memory buffer and stores the data sector in the first memory buffer prior to providing the data sector to the host to satisfy the data read request from the first memory buffer.

DETAILED DESCRIPTION

Advancements in computing technology have resulted in greater amounts of data being generated, transferred, and stored than ever before. While data storage systems have evolved to provide greater data storage capacity in relatively smaller physical sizes, the data transfer speeds of the data storage systems have not been realized due to performance bottlenecks and system inefficiencies. For instance, a solid-state data storage memory, such as NAND flash, can have data input and output speeds that cannot practically be realized because data is to be uniquely configured going into, and coming out of, the memory, which corresponds with heightened processing and time that occupy data interconnections and buffers to the detriment of data storage system performance.

Accordingly, assorted embodiments of this disclosure are generally directed to assigning data a read buffer after the data actually arrives. Such reactive buffer assignment can streamline data flow to a host from the non-volatile memory, reduce processing time and expense, and efficiently maintain data buffers and system interconnections. That is, the intelligent and reactive assigning of a buffer destination for data provides a current, real-time assessment of the status and availability of memory in a data storage system, which can quickly and drastically change when multiple hosts are requesting data from multiple different data storage devices concurrently. The reactive data destination assignment further positions data in an optimal location with respect to predicted system conditions, data access trends, and hardware capabilities to provide the best possible opportunity for the data to be read with the least possible data read latency.

Figure 1:
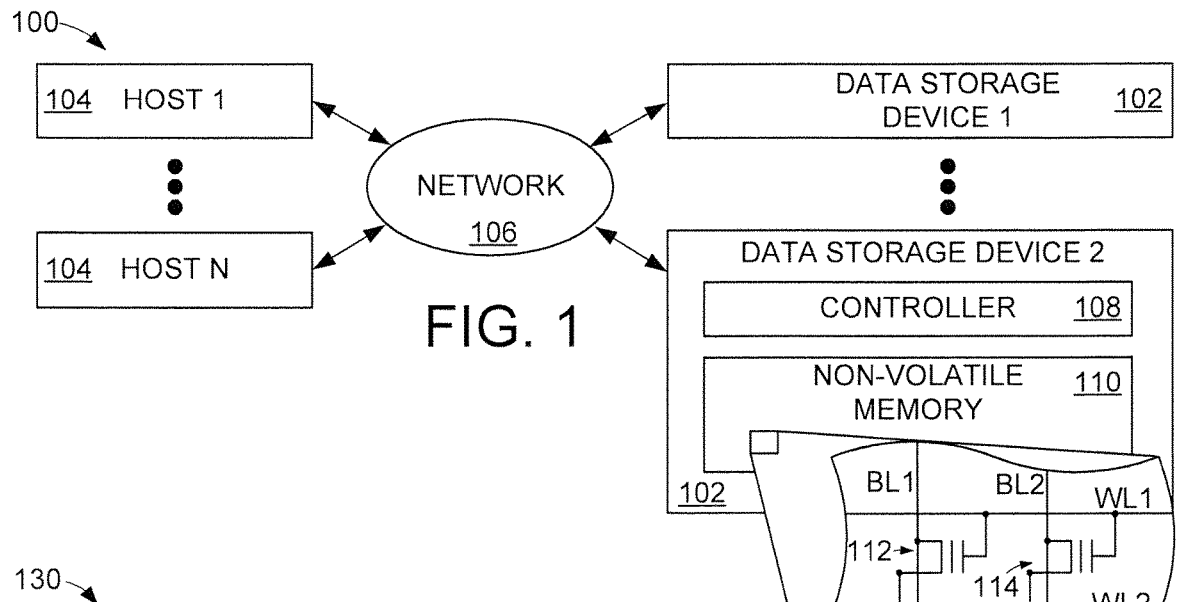
FIG. 1 displays a block representation of an example data storage system in which various embodiments may be practiced.

Although the various embodiments of the present disclosure can be practiced in an unlimited variety of data storage systems, FIG. 1 illustrates an example data storage system 100 in which data storage performance can be optimized. The data storage system 100 can consist of any number of data storage devices 102 connected to any number of hosts 104 via a wired and/or wireless network 106. It is contemplated that a variety of data storage devices 102 can be utilized with different types of memory and varying performance characteristics, such as capacity, data access latency, and physical size. The various hosts 104 can also be different types of computing devices with different computing capabilities. For example, a first host can be a server while a second host is a network node and a third host is a virtual machine that are each located at different physical addresses, such as dissimilar states, and operate with different purpose and structure.

The network 106 may consist of one or more circuits, switches, routers, and distribution means that can transfer data signals to, and from, the respective data storage devices 102. In some embodiments, the network 106 is arranged as a redundant array of independent devices (RAID) with at least one network controller directs data to multiple data storage devices concurrently, or sequentially, when engaging in striping and/or mirroring operations along with the generation and distribution of parity information about data being stored in the data storage device(s) 102.

As shown, at least one data storage device 102 of the system 100 can comprise a controller 108, such as a microprocessor and/or programmable controller, that can direct data into, and out of, at least one non-volatile memory 110, which can be any type of non-volatile data storage, such as NAND flash, filament-based random access memory (RRAM), phase change memory, or rotating magnetic storage. In the event the non-volatile memory 110 is NAND flash, as partially shown schematically in FIG. 1, first (BL1) and second (BL2) bit lines operate with first (WL1) and second (WL2) word lines and first (SL1) and second (SL2) source lines to write and read data stored in first 112, second 114, third 116, and fourth 118 flash cells. It is noted that the respective bit lines correspond with first 120 and second 122 pages of memory that are each the minimum resolution of the memory 110.

It is noted that the construction of the flash memory prevents the flash cells from being individually rewritable in-place and instead are rewritable on a page-by-page basis. Such low data resolution, along with the fact that flash memory wears out after a number of write/rewrite cycles, corresponds with numerous performance bottlenecks and operational inefficiencies compared to memory with cells that are bit addressable. For instance, processing of incoming data to fit a page of flash memory can be expensive in terms of processing power, time, and occupation of valuable buffer/cache space upstream.

Figure 2:
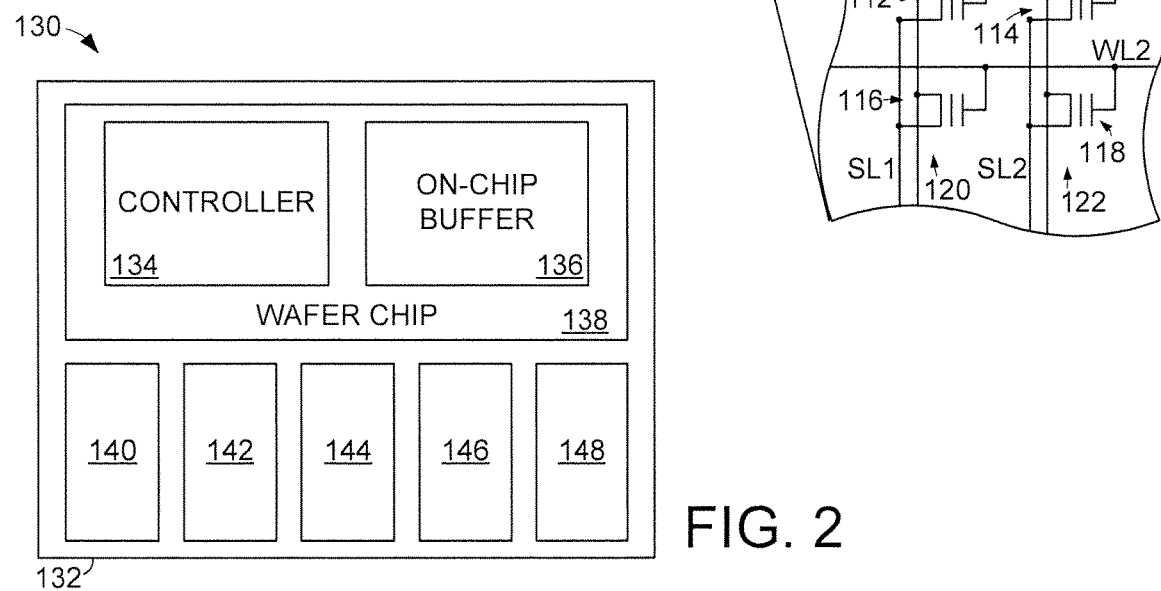
FIG. 2 is a block representation of portions of an example data storage device capable of being utilized in the data storage system of FIG. 1

FIG. 2 displays a block representation of a portion of an example data storage system 130 constructed and operated in accordance with some embodiments. It is noted that the various portions of FIG. 2 can be physically contained within a single housing 132 as part of a single data storage device 102, which may be sealed or unsealed and may be incorporated into a larger physical structure, such as into a data enclosure as part of a data rack. One or more processing means, such as the controller 108 of FIG. 1, can be contained in the housing and connected to at least one memory buffer.

In the non-limiting embodiment shown in FIG. 2, the data storage system 130 connects a local controller 134 to a static random access memory (SRAM) buffer 136 on a common wafer chip 138, which can be characterized as an on-chip buffer. The local controller 134 can also be connected to one or more off-chip buffers 140, such as a dynamic random access (DRAM) buffer. The on-chip buffer 136 can have faster data access speed than the off-chip buffer 140, due to fewer channel and protocol restrictions, but much lower capacity due to the physical size constraints of the wafer chip 138. Hence, the local controller 134 can selectively utilize the on-chip 136 and off-chip 140 buffers to manage the flow of data into, and out of, the non-volatile memory 110 to optimize performance of the data storage system 130.

The wafer chip 138 may additionally support a compression circuit 142 and an encryption circuit 144 that can individually, and collectively, process data being sent to, and received from, the non-volatile memory 110. It is contemplated that the wafer chip 138 can be physically resident in a different portion of the system 130 than the off-chip buffer 140, storage location of system firmware 146, and other volatile, or non-volatile, cache memories 148. For example, the wafer chip 138 can be resident in network hardware, such as a server, switch, router, or controller, while the off-chip buffer 140 and cache memory 148 are locally stored in individual data storage devices 102. In other embodiments, each data storage device 102 of a data storage system consists of a local wafer chip 138 and the off-chip memory 140 is resident in shared network hardware.

Regardless of how the data storage system 130 is arranged, the presence of an on-chip buffer 136, off-chip buffer 140, and other cache storage locations 148 can provide efficient organization, compilation, and flow of data into, and out of, the non-volatile memory 110 of one or more data storage devices 102. However, increased numbers of data destinations upstream of the non-volatile memory 110 can create performance bottlenecks if statically managed without regard for current system load, performance, and capabilities.

Figure 3:
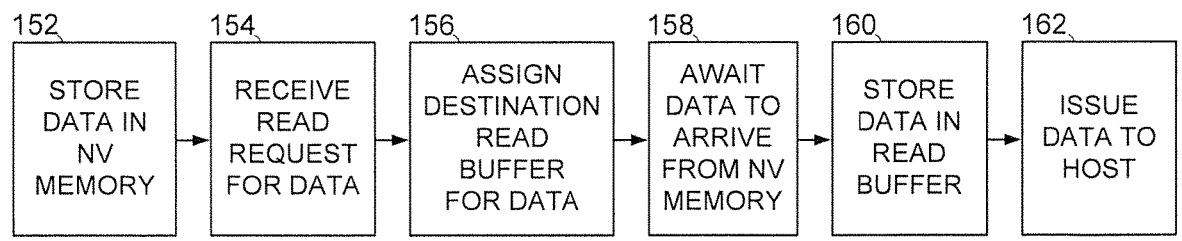
FIG. 3 conveys an example process flow for data in the data storage system of FIG. 1.

FIG. 3 conveys process flow for data in an example data storage system, such as systems 100 and 130. The connection and activation of at least one data storage device to a remote host via wired and/or wireless interconnects allows the system to store any amount of data to a non-volatile (NV) memory in step 152. Subsequent to data storage in a data storage device in step 152, step 154 receives a data read request from one or more hosts. Prior to the data being retrieved from the non-volatile memory of the data storage device, step 156 assigns a destination read buffer for the data in an effort to streamline the flow of read data to the host.

However, the assignment of the read buffer destination in step 156 before data is actually available from the non-volatile memory results in step 158 awaiting the data to arrive. The duration of step 158 can be exacerbated by data processing, such as data decryption and decompression, that occurs prior to the data being ready to be stored in a read buffer in step 160. Hence, the space assigned to the read data in the read buffer in step 156 is out-of-service during step 158 until the read data arrives in step 160 and can be issued to a host in step 162 to satisfy the pending read request from step 154.

Figure 4:
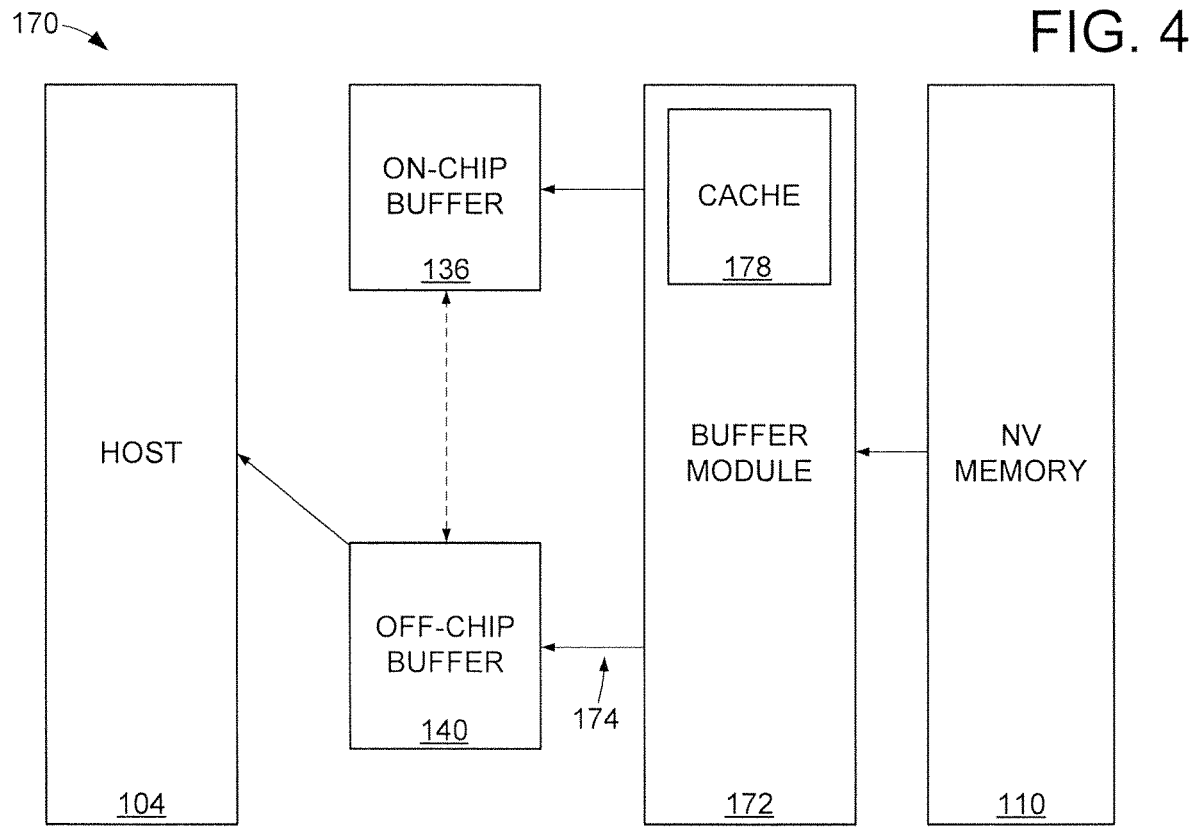
FIG. 4 shows a block representation of portions of an example data storage system configured and operated in accordance with assorted embodiments.

FIG. 4 represents portions of an example data storage system 170 that utilizes a buffer module 172 in accordance with various embodiments to optimize data read performance from one or more data storage devices 102. The buffer module 172 may be physically resident anywhere in the data storage system 170, such as, but not limited to, network hardware and/or each data storage device 102. Thus, it is contemplated that the data storage system 170 consists of multiple, perhaps redundant, buffer modules 172 that are interconnected and configured to communicate and cooperate without issuing counteracting, or counterproductive, commands.

One or more buffer modules 172 can concurrently, sequentially, and individually access at least one on-chip buffer 136 and off-chip buffer 140. More than one on-chip or off-chip buffers may be resident in a single data storage device, or in network hardware, which provides multiple different storage locations available to the buffer module(s) 172 for storage of data retrieved from the non-volatile memory 110 of a data storage device 102. It is contemplated that the data storage system 170 has a plurality of different on-chip 136 and off-chip 140 buffers capable of being utilized by a buffer module 172 for temporary storage of read data. The various buffers 136/140 can utilize any type of organization, such as first in first out (FIFO), by size, by priority, by destination, or by access history (hotness/coldness).

Irrespective of the number and location of various buffers in the data storage system 170, the bus, channel, and interconnect architecture of the on-chip buffer 136 provides greater data transfer speed than the off-chip buffer 140, regardless of the size, position, and type of off-chip buffer 140. For instance, an SRAM on-chip buffer will be faster and perform better than an off-chip buffer 140 regardless of where the off-chip buffer 140 is physically resident or if the off-chip buffer 140 is volatile or non-volatile. In yet, the wafer chip can restrict the size of the on-chip buffer 136, which necessitates the use of off-chip buffers 140 to supplement the on-chip buffer 136. Hence, the combined use of different buffers 136/140 with different data storage and data transfer characteristics create a performance bottleneck 174.

With the presence of one or more bottlenecks 174, assorted embodiments utilize the buffer module 172 to assign a buffer location for newly decrypted and decompressed read data from the non-volatile memory 110 until the data arrives in the buffer module 172. In some embodiments, the buffer module 172 comprises a cache memory 178 that temporarily stores read data while the buffer module assesses which buffer will receive the read data to service a pending data read request from the host 104. It is contemplated that the buffer module 172 can generate a buffer scheme for read that that choreographs movement of read data between multiple buffers 136/140. Such a buffer scheme can set predetermined intervals, or events that trigger movement of read data from one buffer to another, which can maintain at least one portion of the faster on-chip buffer 136 available for high priority read, or write data.

A buffer scheme may alternatively store redundant copies of the read data in the on-chip 136 and off-chip 140 buffers. Such redundant schedule may be conducted concurrently or sequentially to ensure the presence of read data when the host is ready to receive it. The ability of the buffer module 172 to assess system conditions and generate an intelligent buffer scheme to handle read data via a multitude of different buffers allows for diverse different paths and data configurations that are optimized to the current system conditions. However, the buffer module 172 is not restricted only to reactive system evaluation for buffer scheme generation. It is contemplated that the buffer module 172 utilizes predictive capabilities to intelligently prescribe buffer destinations and processing expenditures that maximizes the data storage system's capability to service data access requests from one or more hosts 104.

Figure 5:
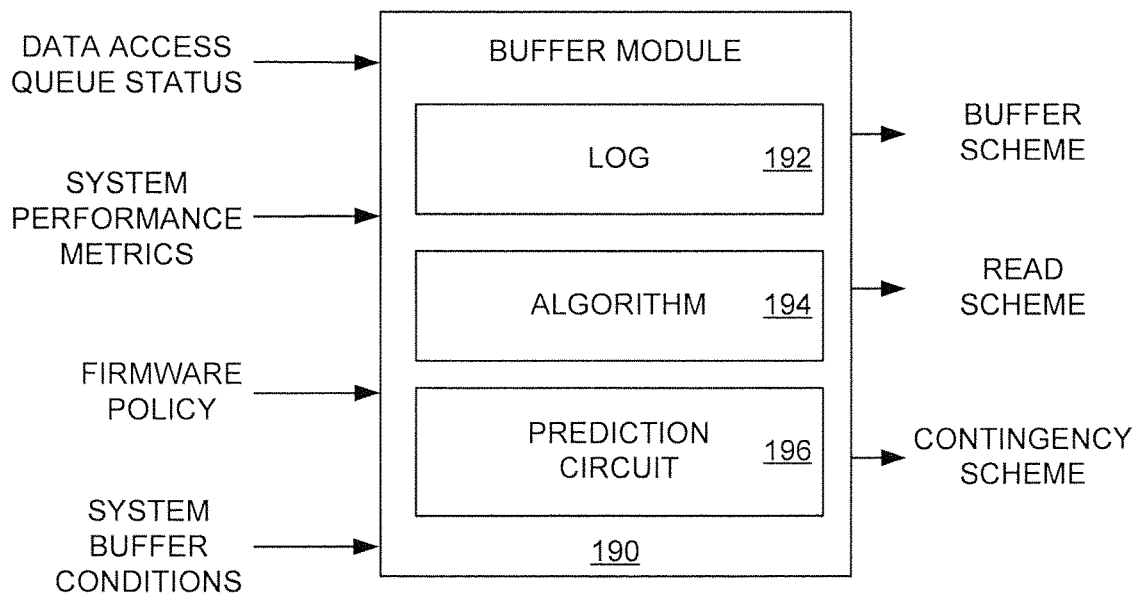
FIG. 5 represents an example buffer module that may be employed in a data storage system in accordance with various embodiments.

FIG. 5 depicts a block representation of an example buffer module 190 that can be utilized in a data storage system in accordance with various embodiments. The buffer module 190 can consist of, or have access to external, logs 192, algorithms 194, and prediction circuits 196 that can individually and collectively be employed to generate a buffer scheme, read scheme, and at least one contingency plan. That is, the buffer module 190 may physically contain memory that temporarily or permanently logs data access and system performance activity experienced by the data storage system. The memory of the buffer module 190 may also store one or more algorithms 194 that can process data and compute system conditions.

A prediction circuit 196 of the buffer module 190 can model future system activity by inputting current system conditions, such as, but not limited to, data access queue status, performance metrics like error rate, read latency, and write latency, system buffer conditions like available free space, and firmware policies for data reads, data writes, and data management. The prediction circuit 196 can process such current system conditions into one or more system models where at least data storage availability, error rate, and access latencies are forecasted. The utilization of the system models allows the buffer module 190 to compare different read data handling schemes to provide optimized system performance.

Figure 6:
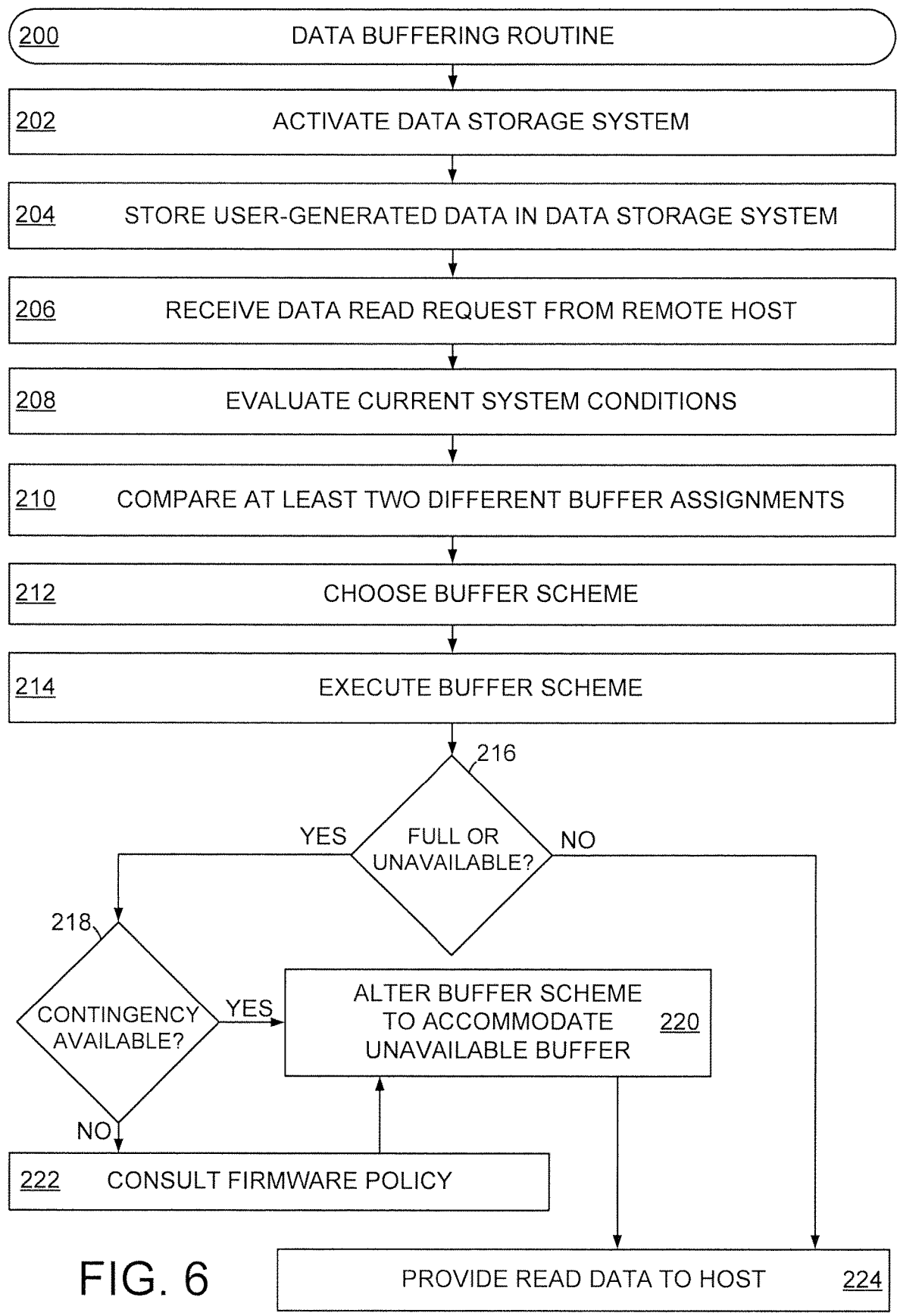
FIG. 6 provides a flowchart of an example data storage system operation routine that can be executed by the data storage system of FIG. 1 in accordance with some embodiments.

FIG. 6 provides a flowchart of an example data buffering routine 200 that is executed with a buffer module as part of a data storage system in accordance with various embodiments. Upon activation of a data storage system in step 202, at least one host writes user-generated data to one or more data storage devices in step 204. At some time after step 204, a data read request for the user-generated data is received by the buffer manager in step 206. Instead of assigning a buffer proactively or in receipt of the data read request, the data storage system waits until the data of the data write request is decrypted and decompressed at arrives at the buffer module to evaluate possible buffer assignments in step 208.

It is noted that step 208 can measure and/or polling for current, real-time system conditions. Step 208 may also consult one or more predicted system conditions and events, but such activity is not required. Next, step 210 compares at least two different buffer assignments before step 212 chooses a buffer scheme that balances the use of system resources to service the data read request and any future read requests for the user-generated data. The scheme chosen in step 212 are then executed in step 214.

During, or after, step 214, decision 216 monitors if a buffer designated by a scheme of step 212 is full or otherwise unavailable, such as due to error or loss of power. If the predetermined buffer cannot be used, contingency scheme(s) generated by the buffer module are consulted in decision 218. The presence of a contingency scheme triggers step 220 to alter the buffer scheme to accommodate the unavailable buffer. If no contingency scheme is present, routine 200 consults firmware policy in step 222 to alter the buffer scheme in step 220.

At the conclusion of storage of the read data into a read buffer from step 220 or if a buffer was available in decision 216, the read data is provided to the requesting host in step 224. It is noted that during, or after step 214, step 206 can be revisited as routine 200 cycles. However, such cycling is not required.

Through the various embodiments of a buffer module that waits until data is received to assign a buffer destination, system conditions can be considered and accommodated. The ability to utilize real-time system conditions along with predicted parameters and events allows the buffer module to intelligently arrange data in assorted buffers to optimize data reading from a remote data storage device. With the buffer module assigning buffer after receipt of read data, system resources are not delayed or preoccupied by assignments for future data, which can be particularly degrading on system performance when numerous data access requests are concurrently being handled between multiple hosts and multiple different data storage devices.

What is claimed is:

1. A method comprising:
    activating a data storage system having a data storage device connected to a host via a network controller, the data storage device comprising a non-volatile memory, the network controller comprising a buffer module connected to a first memory buffer and a second memory buffer;
    receiving a first data read request from the host for a first data sector resident in the non-volatile memory;
    evaluating the first and second memory buffers as a destination for the first data sector after the first data sector arrives at the buffer module and is stored in a cache memory of the buffer module;
    choosing a first buffer scheme with the buffer module in response to the evaluation of the first buffer scheme compared to a second buffer scheme for the first data sector;
    consulting a contingency buffer scheme with the buffer module in response to the first memory buffer being unavailable;
    altering, based on the contingency buffer scheme, the chosen first buffer scheme to accommodate the first memory buffer being unavailable;
    storing the first data sector in the second memory buffer after skipping the first memory buffer in response to the second memory buffer being chosen by the buffer module in accordance with the altered chosen first buffer scheme;
    and providing the first data sector to the host to satisfy the first data read request from the second memory buffer.

2. The method of claim 1, wherein the first memory buffer is separate from the second memory buffer.

3. The method of claim 1, wherein the first and second memory buffers are different types of volatile memory.

4. The method of claim 1, wherein the first data sector remains stored in the cache memory while the buffer module chooses the second memory buffer.

5. The method of claim 1, wherein the buffer module receives a second read request for a second data sector stored in the non-volatile memory.

6. The method of claim 5, wherein the buffer module selects to store the second data sector in the second memory buffer after evaluating the first and second buffer schemes for the second data sector.

7. The method of claim 1, wherein the buffer module stores user-generated write data from the host in the second memory buffer.

8. The method of claim 1, wherein buffer module comprises a selection circuit that makes a hardware-based decision to store the first data sector in the second memory buffer in response to the contingency scheme being unavailable.

9. The method of claim 1, wherein the buffer module selects the second memory buffer after the first data sector is decrypted and decompressed.

10. A method comprising:
activating a data storage system having a data storage device connected to a host via a network controller, the data storage device comprising a non-volatile memory, the network controller comprising a buffer module connected to an on-chip memory buffer and an off-chip memory buffer;
receiving a first data read request from the host for a first data sector resident in the non-volatile memory;
evaluating the on-chip and off-chip memory buffers as a destination for the data sector after the data sector arrives at the buffer module and is stored in a cache memory of the buffer module;
choosing a first buffer scheme with the buffer module in response to the evaluation of the first buffer scheme compared to a second buffer scheme for the first data sector;
consulting a contingency buffer scheme with the buffer module in response to the on-chip memory buffer being unavailable;
altering, based on the contingency buffer scheme, the chosen first buffer scheme to accommodate the on-chip memory buffer being unavailable;
storing the first data sector in the off-chip memory buffer, instead of the on-chip memory buffer, the off-chip memory buffer chosen by the buffer module in accordance with the altered chosen first buffer scheme;
and providing the first data sector to the host to satisfy the first data read request from the off-chip memory buffer.

11. The method of claim 10, wherein the buffer module comprises a prediction circuit and a log that forecast a read performance for each memory buffer prior to the buffer module selecting the off-chip memory buffer.

12. The method of claim 11, wherein the buffer module compares real-time detected conditions in each of the memory buffer to the forecasted read performance for each of the memory buffer to select the off-chip memory buffer.

13. The method of claim 10, wherein the buffer module redundantly stores the data sector in the on-chip memory buffer when the on-chip memory buffer is available.

14. The method of claim 10, wherein the buffer module concurrently stores the data sector in the off-chip memory buffer and temporarily stores the data sector in the cache memory.

15. The method of claim 10, wherein the buffer module satisfies a second read request by returning a second data sector to the host after storing a second data sector in the on-chip memory buffer and skipping the off-chip memory buffer in accordance with buffer module selecting the second buffer scheme when the on-chip memory buffer is available.

16. The method of claim 15, wherein a third buffer scheme schedules moving, at a predetermined time, the data sector from the off-chip memory buffer to the on-chip memory buffer when the on-chip memory buffer is available.

17. The method of claim 15, wherein a third buffering scheme schedules moving, responsive to a predicted event, the data sector to the on-chip memory buffer when the on-chip memory buffer is available.

18. An apparatus comprising a data storage system having a data storage device connected to a host via a network controller, the data storage device comprising a non-volatile memory, the network controller comprising a buffer module connected to an on-chip memory buffer, a cache memory, and an off-chip memory buffer, the buffer module configured to store a data sector resident in the non-volatile memory into the cache memory, while a buffering scheme is chosen by the buffer module after an evaluation of a first buffer scheme compared to a second buffer scheme for the data sector, the buffer module to consult a contingency buffer scheme in response to the off-chip memory buffer being unavailable and alter, based on the contingency buffer scheme, the chosen buffer scheme to accommodate the off-chip memory buffer being unavailable, the altered chosen buffer scheme executed to move the data sector to the on-chip memory buffer, prior to satisfying a read quest for the data sector from the on-chip memory buffer, after skipping the off-chip memory buffer and choosing the on-chip memory buffer in accordance with the altered chosen first buffer scheme.

19. The apparatus of claim 18, wherein the data storage device comprises a compression circuit and an encryption circuit connected between each memory buffer and the non-volatile memory.

20. The apparatus of claim 18, wherein the non-volatile memory comprises flash memory.

* * * * *